United States Patent
Hubbard

[15] 3,650,297
[45] Mar. 21, 1972

[54] SPOOL RELEASE AND SEQUENCE VALVE

[72] Inventor: Glenn R. Hubbard, Racine, Wis.
[73] Assignee: Webster Electric Company, Inc., Racine, Wis.
[22] Filed: Sept. 30, 1970
[21] Appl. No.: 76,686

[52] U.S. Cl. .................................. 137/624.27, 137/625.69
[51] Int. Cl. .......................................... F15b 13/01
[58] Field of Search .......................... 137/624.27, 625.69

[56] References Cited

UNITED STATES PATENTS

| | | | |
|---|---|---|---|
| 2,689,585 | 9/1954 | Presnell | 137/624.27 |
| 2,844,166 | 7/1958 | Edman | 137/624.27 |

*Primary Examiner*—Alan Cohan
*Attorney*—Mason, Kolehmainen, Rathburn & Wyss

[57] ABSTRACT

A hydraulic valve includes a spool movable from an inactive position to a pair of operating positions in each of which one of a pair of motor ports is pressurized. A detent latches the spool in its operating positions, and a spring biased plunger normally urges the detent into engagement with the spool. One side of the plunger is exposed to valve inlet pressure, and normally the plunger is maintained in hydraulic balance by means of restricted communication between its two sides. A pair of pressure responsive valves communicate between the second side of the plunger and the motor ports, and are independently adjustable to open at predetermined pressures thereby to unbalance the plunger and release the spool from the operating positions. The valve may be provided with a centering spring so that upon release the spool returns to its inactive position. Alternatively, the valve is provided with a reversing spring arrangement serving to reverse the operation of the valve when the spool is released from a first operating position so that a pair of operations are automatically carried out in sequence. A system including two or more valves carries out several hydraulic operations in sequence.

12 Claims, 3 Drawing Figures

INVENTOR:
GLENN R. HUBBARD
BY Mason, Kolehmainen
Rathburn & Wyss
ATTORNEYS

SPOOL RELEASE AND SEQUENCE VALVE

The present invention relates to hydraulic valves having spool latching and release mechanisms, to valves capable of carrying out a pair of operations in sequence, and to systems including such valves and capable of carrying out several operations in sequence.

Hydraulic valves having detents are well known. Typically such valves may include a movable spool and a detent for holding the spool in one or more operating positions wherein fluid is supplied to a hydraulic motor or the like. The detent is released when the pressure of the fluid supplied to the motor reaches a predetermined level due to motor load, end of the motor travel, blockage or the like. When the detent is released, the spool is returned to its inactive position by a centering spring. An example of a valve of this type may be found in U.S. Pat. No. 2,862,518. Also known are hydraulic systems including two valves both held in operating positions wherein the second valve receives fluid only after the first valve completes one operation and returns to its inactive position. In systems of this type, a pair of operations are carried out in sequence under the control of a pair of valves. For example, a hydraulic system of this nature is disclosed in U.S. Pat. No. 3,233,525.

Among the important objects of the present invention are to provide an improved hydraulic valve having a novel detent release mechanism; to provide a detent and release mechanism requiring no expensive elongated or complex passages or the like; to provide a valve wherein different detent release pressures may be used for releasing the valve from different operating positions or wherein the detent may be automatically released from one position and not released from the other position; to provide a valve wherein manual overriding of the detent requires only a small force, even if the detent is adjusted to release at high pressures; to provide a single valve capable of carrying out a pair of operations in sequence; and to provide a hydraulic system for carrying out several operations in sequence.

In brief, the above and other objects and advantages of the present invention may be realized through the provision of a valve including a supply passage supplied with pressurized fluid from a pump or the like and a pair of motor passages adapted to communicate with fluid utilization means such as one or more fluid motors or the like. A valve member in the housing is movable between an inactive position and a pair of operating or active positions wherein the supply passage is communicated with one or the other of the motor passages. When the valve member is moved to an operating position, a movable detent is urged by a spring into latching engagement with the valve member thereby to hold the valve member in the operating position. A plunger operatively coupled to the detent is normally hydraulically balanced since one side of the plunger is communicated by a direct straight through connection with the supply passage and the other side of the plunger is in restricted communication with the first side. A pair of normally closed pressure operated valves are connected between the second side of the plunger and the motor passages, and may be independently adjusted to open at different fluid pressures. Thus, in either operating position of the valve, when a predetermined pressure is reached the pressure responsive valve opens to vent the second side of the plunger causing release of the detent.

In one arrangement, the valve member is provided with a centering spring whereby upon release of the detent the valve member returns to its inactive position. In another arrangement, there is provided a spring assembly for moving the valve member from one operating position to the second operating position upon release of the spring member. With this arrangement, the single valve member may be used to carry out a pair of sequential operations. Furthermore, two or more of the valves may be used in a hydraulic system capable automatically of carrying out several operations in sequence.

The invention together with the above and other objects thereof may more clearly appear from the following detailed description of the embodiments of the invention shown in the drawings wherein.

Figure 1:
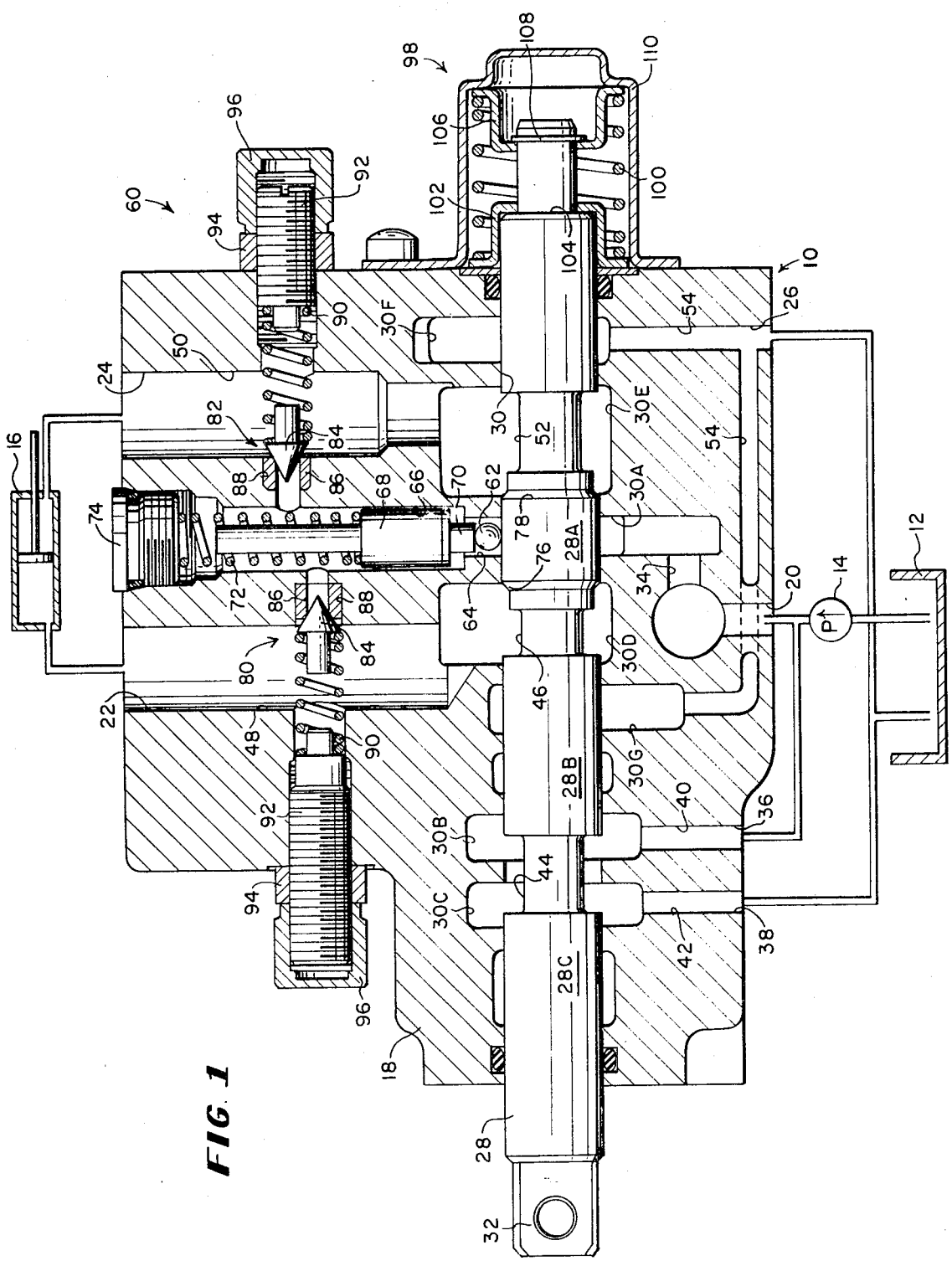
FIG. 1 is a simplified and partly diagrammatic sectional view of a valve apparatus embodying features of the present invention.

Having reference now to the drawings and initially to FIG. 1, there is illustrated a hydraulic valve apparatus designated as a whole by the reference numeral 10 and constructed in accordance with the principles of the present invention. In general, the valve 10 serves to control the application of fluid received from a suitable supply such as a tank or reservoir 12 and pressurized by a pump 14 to a fluid utilization device illustrated as comprising a double acting hydraulic motor 16. The valve 10 includes a housing 18 provided with an inlet or supply port 20 receiving pressurized fluid from the pump 14, and a pair of motor ports or outlet ports 22 and 24 connected to opposite ends of the motor 16. A low pressure return or tank port 26 serves to return fluid at low pressure to the reservoir 12.

It should be understood that the valve 10 may be used to operate fluid utilization devices other than the illustrated motor 16. For one example, a pair of separate single acting motors could be coupled to the two motor ports 22 and 24.

In order to control the flow of fluid between the supply port 20, the motor ports 22 and 24 and the tank port 26, the valve 10 includes a valve member 28 in the form of a spool movable within a bore 30 defined in the housing 18 between an illustrated inactive or standby condition and a pair of active or operating positions. The spool 28 includes a projecting end portion 32 adapted to be connected to a suitable operating handle or other actuator for moving the spool 28 from its illustrated central, inactive position in either direction to either one of its operating positions.

Pressurized fluid made available at the inlet port 20 communicates by way of a supply or inlet passage 34 with an annular inlet enlargement 30A along the bore 30. If desired, a conventional anti-interaction valve and/or a conventional overpressure relief valve may be associated with passage 34 in known manner. In the inactive position of the spool 28 illustrated in FIG. 1, flow through the inlet passage 34 is blocked because a segment 28A of the valve spool 28 engages portions of the bore 30 at either side of the enlargement 30A. Consequently, no fluid is permitted to reach the motor 16 in the inactive position of the valve 10.

As is conventional practice in hydraulic valves of the type illustrated, the housing 18 includes an additional bypass passage in the form of a tandem center passageway comprising a pair of additional ports 36 and 38 coupled by passageways 40 and 42 with a pair of enlargements 30B and 30C in the bore 30. In the illustrated inactive position of the valve, the enlargements 30B and 30C are freely intercommunicated by means of a groove 44 in the valve spool 28. In order to reduce the fluid pressure reflected to the pump 14 in the inactive position of the valve, the port 36 and the inlet port 20 are connected in common to the pump outlet so that in the inactive position fluid is returned to tank without significant pressure increase through the passage 40, the enlargement 30B, the groove 44, the enlargement 30C, and the passage 42.

When it is desired to operate the motor 16 in one of its alternative directions, the spool valve member 28 is moved from the inactive position to one of its two operating positions. Movement of the spool 28 inwardly of the housing 18, or to the right as illustrated in FIG. 1, results in extension of or movement of the piston of the motor 16 to the right as illustrated in FIG. 1. More specifically, the segment 28A of the spool 28 moves to the right as illustrated in FIG. 1 and a groove 46 in the spool establishes communication between the enlargement 30A and an adjacent enlargement 30D of the bore 30. The enlargement 30D communicates by means of a motor or outlet passage 48 with the motor port 22 and thus with one end of the motor 16.

Fluid displaced from the opposite side of the motor 16 when the enlargement 30D is pressurized returns by way of the motor port 24 and a motor or outlet passage 50 to an enlargement 30E along the valve bore 30. Movement of the spool 28 to the right as described above causes a groove 52 in the spool 28 to establish communication between the enlargement 30E and an adjacent enlargement 30F communicating by means of a forked tank passage 54 with the return or tank port 26.

When the spool 28 is moved in the alternative direction, or to the left as illustrated in FIG. 1, a similar but reverse operation takes place and the motor 16 is retracted. More specifically, the groove 52 establishes communication between the enlargement 30A and the enlargement 30E, whereupon pressurized fluid flows by way of the supply passage 34 and the motor passage 50 to the motor 16, and fluid is returned from the motor 16 through the motor passage 48. Groove 46 establishes communication between the enlargement 30D and an enlargement 30G to permit displaced fluid to return to the reservoir 12 by way of passage 54 and the tank port 26.

In both of the alternative operating positions of the valve spool 28, the additional, tandem center passage is blocked thereby to prevent a low resistance bypass through the valve of the motor 16. More specifically, the spool 28 includes a pair of segments 28B and 28C flanking the groove 44 and cooperating with the portion of the bore 30 between the enlargements 30B and 30C to prevent communication therebetween in either operating position.

In accordance with an important feature of the present invention, there is provided a novel detent and detent release mechanism generally designated by the reference numeral 60 for holding the valve in either of its operating positions and for releasing the valve in response to predetermined pressure conditions. Importantly, the detent release conditions may be independently adjusted so that different pressures result in release of the detent in the two different operating positions of the spool 28, or, if desired, so that the detent is not released in one position. Furthermore, the detent mechanism can readily be overcome manually at any pressure setting.

More specifically, in the illustrated arrangement the detent comprises a detent member in the form of a ball 62 held in a passageway or channel 64 of the housing 18, which channel extends between the valve bore 30 and an additional cylindrical bore 66. A plunger or piston 68 is slidably received in the bore 66 and includes a nose portion 70 adapted to abut against the ball 62. If desired, the detent member could take other forms, one example being an integral extension of the nose portion 70. A spring 72 held in compression between the plunger 68 and a closure member 74 normally urges the detent ball 62 into engagement against the spool member 28.

An important advantage of the present invention resides in the simplicity and consequent cost savings due to the arrangement of the detent and release mechanism 60. The pressure connection involves the simple extension of the enlargement 30A readily produced by a step drilling of passages 64 and 66. This novel arrangement is much simpler than known commercial units wherein the pressure passages may comprise passages drilled through the valve spool or valve body to one or both ends of the spool, or even an external conduit.

In the illustrated inactive position of the spool 28, the ball 62 is urged against the cylindrical surface of the segment 28A of the spool 28. In this position there is little or no resistance provided to reciprocal movement of the spool 28, and the valve may be easily positioned in either operating position.

When the valve spool 28 is moved to one of its alternative operating positions, the spring 72 urges the ball 62 into seating engagement with one of a pair of shoulders 76 and 78 located on the spool 28 at either side of the spool portion 28A. The configuration of the shoulders 76 and 78 relative to the shape of the detent member 62 is such that the force of the spring 72 is sufficient to hold the spool valve member in either operating condition to which it is moved, and is small enough to permit easy manual release by returning the spool 28 to its central position.

In accordance with an important feature of the present invention, there is provided a novel arrangement for release of the detent 62 in response to predetermined pressure conditions. In either operating position the inlet or supply passage 34 communicates continuously by way of the enlargement 30A of the bore 30 and the channel 64 with the bore 66, and the lower side of the plunger 68 is thus freely communicated with and subject to the pressure condition existing in the inlet passage 34. This pressure is determined by the load imposed on the system by operation of the motor 16.

In order normally to balance the plunger 68 hydraulically, the upper or second side of the plunger 68 communicates in a restricted fashion with the lower side of the plunger. In the illustrated arrangement this is accomplished by providing a restricted clearance between the outer diameter of the plunger 68 and the inner diameter of the bore 66. Alternatively, a separate restricted passage could be provided. Consequently, under normal operating conditions, the plunger 68 is hydraulically balanced and the spring 72 is permitted to maintain the spool 28 latched in the operating position.

In accordance with the invention there are provided a pair of normally closed, pressure responsive valves 80 and 82 communicating between the upper side of the plunger 68 and the motor passages 48 and 50 in order to permit release of the detent 62 at adjustable, independent pressures. In either operating position of the spool 28, one of the valves 80 and 82 will be subject to the pressure differential existing between the supply fluid passageway 34 and the low return or tank pressure existing in the non-pressurized motor passage. The valves 80 and 82 are adjusted to open at predetermined pressures, and when this occurs, the pressure at the upper side of the plunger 68 is abruptly reduced and the hydraulic unbalance to which the plunger is subjected overcomes the force of the spring 72 and releases the detent ball 62 from its engagement with the spool 28.

More specifically, the valves 80 and 82 may be of substantially similar construction and each includes a valve member 84 sealingly engageable with a valve seat 86 mounted in a passageway 88 extending between the bore 66 and the corresponding motor passage 48 or 50. The valves 80 and 82 are normally maintained in a closed condition by means of springs 90 mounted in compression between the valve members 84 and adjustable spring abutments 92 held in position by lock nuts 94 and suitable caps 96. The spring abutments 92 are conveniently adjustable from the exterior of the housing 18 and furthermore are independently adjustable. As a result, the operating pressures of the valves 80 and 82 may be different from one another to the end that the detent 62 is released at different pressures as may be desirable in order to accommodate specific hydraulic operations of the motor 16 or the like.

In the embodiment of the invention illustrated in FIG. 1, the valve 10 is provided with a centering spring assembly 98 serving upon release of the detent 62 to return the valve spool 28 from either operating position directly to the illustrated inactive position. Assembly 98 includes a spring 100 held between a spring retainer 102 abutting a shoulder 104 on the spool 28 and a spring retainer 106 abutting a washer 108 on the spool 28. Movement of the spool in either direction causes the spring 100 to be compressed toward the housing 18 or toward a cap member 110 to create a centering force.

Even when the detent is to be released at high pressure conditions and the operating pressure is substantial, it is possible to manually return the spool to its inactive position easily and with only a small force. Since during operation prior to release of the detent 62 the plunger 68 is hydraulically balanced, the spring 72 need exert only that force required to hold spool 28 in position by action of the detent 62 against force provided by the centering spring 100. In many known systems the detent force is necessarily proportional to the selected release pressure, and manual control is therefore difficult at high pressure settings.

Since the release of the spool 28 from its two operating positions is controlled independently, it is possible to adjust or modify the valve 10 so that is is automatically released from one position and not from the other. This may be accomplished by blocking or omitting either one of the valves 80 and 82 or adjusting the valve to a pressure higher than any that will be encountered.

Reviewing the operation of the valve 10, in the inactive position illustrated in FIG. 1, fluid from the pump 10 does not flow into the inlet passage 34 due to the blockage provided by the segment 28A of the valve spool 28, but rather is bypassed and returned at low pressure through the tandem center passage including enlargements 30B and 30C of the bore 30. When the spool 28 is moved in either direction to an operating position, the spool 28 is latched in position by detent 62, plunger 68 and spring 72. Pressurized fluid is made available at one of the outlet ports 22 and 24, the other outlet port being communicated with the low pressure return or tank port 26. Pressurized fluid is also communicated through channel 64 to the bore 66 below the plunger 68, and by restricted communication to the upper side of the plunger 68.

During operating of the motor 16, one of the valves 80 and 82 is subject only to the small or negligible pressure difference between the fluid inlet passage 34 and the pressurized motor port and thus is of no effect. The other valve 80 or 82 is subjected to the pressure difference between the inlet fluid pressure and the low pressure existing at the return motor passage. When this pressure difference reaches a predetermined value, the force of the corresponding spring 90 is overcome and the valve opens. For example, this may occur at the end of stroke of the motor 16, or when the motor load reaches a predetermined maximum value, or the like. Since the valves 80 and 82 may be set to open at different pressures, the valve may respond to different pressure conditions in its different operating positions.

As a result of opening of one of valves 80 and 82, the upper side of plunger 68 is vented to low pressure. Due to the restricted nature of the communication with the opposite side of the plunger, a pressure differential is applied to the plunger 68 in opposition to the spring 72 to move the plunger 68 and release the detent 62. At this time the centering spring assembly 98 is permitted to return the spool 28 to its inactive position.

Figure 2:
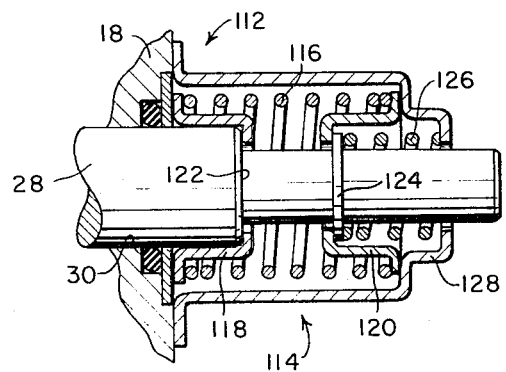
FIG. 2 is a fragmentary sectional view illustrating an alternative embodiment of the invention.

Having reference now to FIG. 2 of the drawings, there is illustrated a portion of a valve generally designated as 112 comprising an alternative embodiment of the invention. Except for the portion illustrated, the valve 112 may be identical to the valve 10 described above and illustrated in FIG. 1, and identical reference numerals are used where applicable.

In accordance with an important feature of the invention, the single valve 112 is capable of carrying out two operations automatically and in sequence. The valve 112 includes a reversing spring assembly generally designated as 114 including a centering spring 116 held between a pair of retainers 118 and 120 bearing respectively against a shoulder 122 and a washer 124 fixed to the valve spool 28. In addition, there is provided a reversing spring 126 held in compression between the washer 124 and a cap member 128 attached to the housing 18 of the valve 112.

Spring 126 is a weaker spring than spring 116 and as a result the spring assembly 114 normally maintains the valve 112 in the illustrated position wherein spool 28 is in the inactive position. Since in this position the retainer 120 contacts the cap member 128, when the spool 28 is moved to one operating position to the right as illustrated in FIG. 2, the spring 126 has no effect. However, when spool 28 is moved in the opposite direction to its other operating position, the spring 126 provides a force in opposition to the spring 116, and as a result less force is required to move the spool 28.

In accordance with the invention, the spring forces and the momentum of the valve spool 28 are chosen so that when the spool is released from its first, or right-hand operating position, it moves through its inactive or standby, central position to its second or left-hand operating position. In contrast, when the spool 28 is released from its second, left-hand position, it returns only to its central, standby position due to the larger spring force to be overcome in this direction.

In operation of the embodiment of the invention disclosed in FIG. 2, the spool 28 of the valve 112 is moved inwardly of the housing 18 to its first operating position, whereupon it is latched in position. Pressurized fluid is supplied to a fluid utilization device through one motor port in order to carry out a first hydraulic operation. When a predetermined pressure condition is reached upon completion of the first operation, the spool 28 is automatically released in the manner described above in connection with the valve 10. Upon release, the spring assembly 114 moves the spool to its alternative operating position where it is latched and a second hydraulic operation is automatically commenced. Upon release of the spool 28 when the second operation is completed, the spool 28 returns to its initial standby position.

Figure 3:
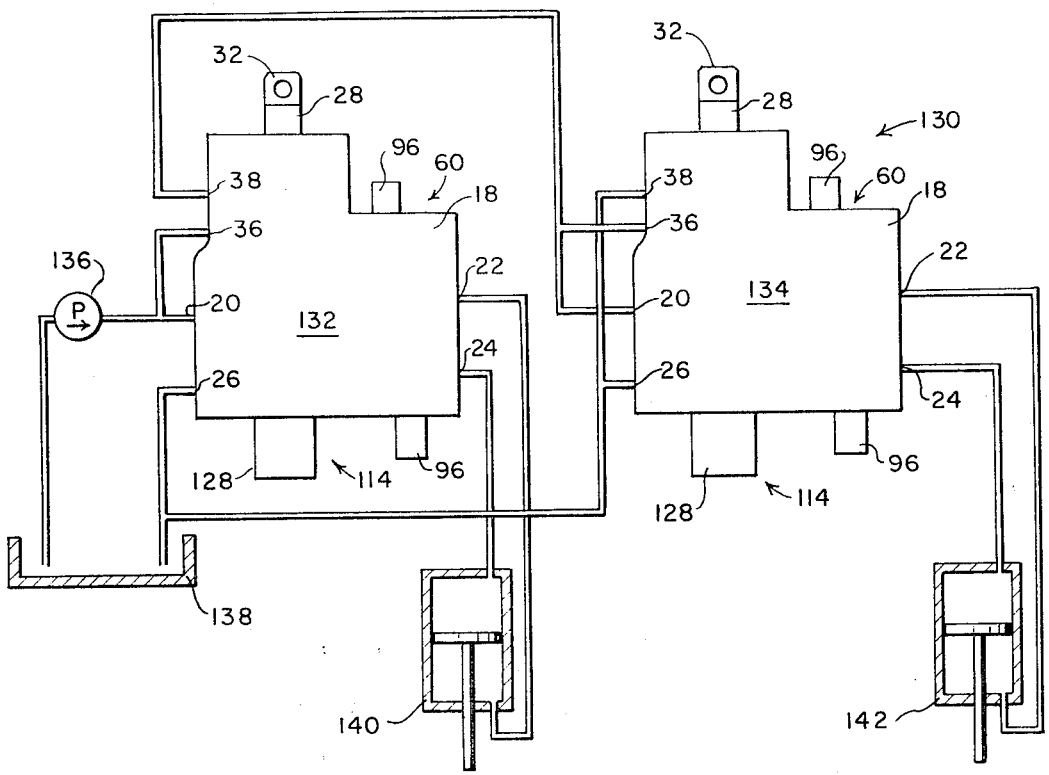
FIG. 3 is a largely schematic and diagrammatic illustration of a hydraulic system embodying features of the present invention.

Referring now to FIG. 3 there is illustrated in largely schematic form a hydraulic system generally designated by the reference numeral 130 and embodying features of the present invention. The system 130 includes a pair of valves 132 and 134, each of which may be identical with the valve 112 described above, and thus in many respects identical with the valve 10 illustrated in FIG. 1.

In accordance with the invention, the system 130 after being conditioned for operation automatically carries out a sequence of four hydraulic operations. More specifically, the system 130 includes a pump 136 for supplying pressurized fluid from a reservoir 138, and operates to apply pressurized fluid sequentially to extend and retract a pair of hydraulic motors 140 and 142. It should be understood that other hydraulic operations may be carried out in sequence if desired.

Pressurized fluid from the pump 136 is applied in parallel to the inlet port 20 and the additional tandem center port 36 of the valve 132. In the illustrated condition of the system 130, both valves 132 and 134 are in their inactive positions. Thus the inlet port 20 of valve 132 is blocked, and fluid emerges from port 38. Fluid from the port 38 of valve 132 is applied in common to both the inlet port 20 and the additional port 36 of the valve 134. Since this valve is in its standby position, port 20 is blocked and fluid is returned to the reservoir 138 through a low pressure return line 144 from port 38 of the valve 134.

In order to commence a series of operations, spools 28 of both valves 132 and 134 are moved inwardly of housing 18 to their first operating positions wherein they are latched by the respective detent mechanisms 60. As a result, the first hydraulic operation comprising extension of motor 140 is commenced. More specifically, the passageway between ports 36 and 38 of valve 132 is blocked, and no fluid is available initially to valve 134. Fluid flows through the inlet 20 to motor port 24 of valve 132 thereby to pressurize the motor 140. Displaced fluid is returned through port 22 by way of tank port 26 of valve 132 to the reservoir 138.

When motor 40 is extended to the desired extent, the predetermined release pressure is attained between system inlet pressure existing between ports 20 and 24 and the low pressure existing at port 22. As a result, the spool 28 is released and is moved to and latched in its alternate operating position by the reversing spring assembly 114. In this position, the motor port 22 is pressurized to bring about retraction of the motor 140. When a predetermined pressure condition is reached, spool 28 is again released and moves to its standby position.

In response to completion of operation of the valve 132, fluid is supplied to valve 134 for carrying out two more hydraulic operations. Return of spool 28 of valve 132 to its standby position permits fluid to flow through ports 36 and 38 of the valve 132 to the inlet port 20 of the valve 134. Since valve 134 is in its first operating position, fluid flows through its motor port 24 to extend motor 142. Upon release of spool 28, the spool moves to its alternate operating position and motor 142 retracts. At the end of the sequence of operations valve 134 also returns to its initial standby condition.

If desired, the system could be enlarged to include more valves and motors. In addition, different types of sequences and motors may be substituted for the illustrated arrangement.

Although the invention has been described in connection with details of the illustrated embodiments, it should be understood that other modifications and embodiments may be devised which fall within the true spirit and scope of the invention as defined in the following claims.

What is claimed and desired to be secured by Letters Patent of the United States is:

1. Valve apparatus comprising housing means including a supply passage adapted to communicate with a source of pressurized fluid, a pair of motor passages adapted to communicate with fluid utilization means, a valve member mounted in said housing for movement between an inactive position and a pair of active positions wherein the supply passage is communicated respectively with the pair of motor passages, a movable detent, spring means for biasing said detent into engagement with said valve member for latching said valve member in said active positions, a pair of pressure responsive valves each operable in response to a predetermined pressure differential between said supply passage and one of said motor passages, and means for moving said detent in opposition to said spring to release said valve member in response to operation of either of said pressure responsive valves.

2. Valve apparatus as claimed in claim 1, said housing including a bore, a plunger in said bore, said detent being operatively associated with said plunger, and said moving means applying a pressure differential to said plunger upon operation of either of said pressure responsive valves.

3. Valve apparatus as claimed in claim 2, means communicating a first side of said plunger with said supply passage, restricted means communicating the second side of said plunger with said supply passage, and means including said pressure responsive valves communicating said second side of said plunger with said motor passages.

4. The valve apparatus of claim 3, said restricted means comprising a restricted clearance in said bore around said plunger.

5. The valve apparatus of claim 4, said bore and said detent and at least part of said inlet passage being located in a single plane.

6. The valve apparatus of claim 4, said bore being located in said housing between said motor ports, a pair of passages extending from said bore at the second side of said plunger to said motor ports, and said pressure responsive valves being disposed in said passages.

7. The valve apparatus of claim 6, said pressure responsive valves each including an adjustment member external of said housing for adjusting the operating pressure thereof.

8. Valve apparatus as claimed in claim 1, a spring assembly connected to said valve member.

9. Valve apparatus as claimed in claim 8, said spring assembly including means for moving said valve member to the inactive position upon release from either active position.

10. Valve apparatus as claimed in claim 8, said spring assembly including means for moving said valve member to a second active position upon release from a first active position.

11. Valve apparatus comprising housing means including a supply passage adapted to communicate with a source of pressurized fluid, a pair of motor passages adapted to communicate with fluid utilization means, a valve member mounted in said housing for movement between an inactive position and an active position wherein said supply passage is communicated with one motor passage and the other motor passage is communicated with a region of low pressure, a cylinder in said housing, a plunger reciprocally mounted for movement in said cylinder, detent means operatively connected to said plunger and engageable with said valve member, a spring for applying a force to one side of said piston for urging said detent means against said valve member to latch said valve member in said active position, means communicating said supply passage with the other side of said plunger, restriction means establishing restricted communication between the opposite sides of said plunger for normally hydraulically balancing said plunger, and a normally closed pressure responsive valve connected between said one side of said plunger and said other motor passage.

12. Valve apparatus as claimed in claim 11, said restriction means comprising a clearance between said cylinder and said plunger.

* * * * *